(12) United States Patent
Nagai et al.

(10) Patent No.: US 8,102,141 B2
(45) Date of Patent: Jan. 24, 2012

(54) INVERTER DEVICE

(75) Inventors: Kazunobu Nagai, Yokohama (JP);
Takeshi Shibayama, Yokohama (JP);
Sari Maekawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 351 days.

(21) Appl. No.: 12/547,033

(22) Filed: Aug. 25, 2009

(65) Prior Publication Data
US 2010/0052599 A1    Mar. 4, 2010

(30) Foreign Application Priority Data

Aug. 26, 2008   (JP) ................. 2008-216593

(51) Int. Cl.
*H02P 27/08*   (2006.01)
(52) U.S. Cl. ......... 318/766; 318/727; 318/747; 318/746
(58) Field of Classification Search .................. 318/766, 318/727, 747, 746
See application file for complete search history.

(56) References Cited

U.S. PATENT DOCUMENTS 5,729,113 A * 3/1998 Jansen et al. .................. 318/799

FOREIGN PATENT DOCUMENTS

| JP | 64-8896 | 1/1989 |
|---|---|---|
| JP | 2-111288 | 4/1990 |

* cited by examiner

*Primary Examiner* — Walter Benson
*Assistant Examiner* — David Luo
(74) *Attorney, Agent, or Firm* — Oblon, Spivak, McClelland, Maier & Neustadt, L.L.P.

(57) ABSTRACT

An inverter device driving an induction motor including main and auxiliary windings both having different winding specifications includes a three-arm inverter circuit having phase output terminals connected to the main winding, the auxiliary winding and a neutral winding of the induction motor respectively and converting a DC power supply to two-phase substantially sinusoidal PWM voltage, a current detector detecting currents of the respective main and auxiliary windings from a DC power supply current, a vector control computing unit obtaining balanced inductance values and resistance values from inductance values and resistance values of the respective main and auxiliary windings, determining a two-phase voltage to be supplied to the induction motor by vector control computing based on the balanced inductance values and resistance values, and a PWM signal forming unit forming a PWM signal controlling the inverter circuit according to the two-phase voltage.

7 Claims, 10 Drawing Sheets

| Du:Dv:Dw | ZONE | TIMING_AD0 | TIMING_AD1 | Ia | Ib |
|---|---|---|---|---|---|
| Dw<Du<Dv | 1 | T(Du+M) | 0 | AD1-AD0 | AD0 |
| Du<Dw<Dv | 2 | T(Dw+M) | 0 | -AD1 | AD0 |
| Du<Dv<Dw | 3 | T(Dv+M) | 0 | -AD1 | AD1-AD0 |
| Dv<Du<Dw | 4 | T(Du+M) | 0 | AD1-AD0 | -AD1 |
| Dv<Dw<Du | 5 | T(Dw+M) | 0 | AD0 | -AD1 |
| Dw<Dv<Du | 6 | T(Dv+M) | 0 | AD0 | AD1-AD0 |
| \|Du-Dv\|<2M OR \|Dv-Dw\|<2M OR \|Dw-Du\|<2M | 0 | - | - | - | - |

FIG. 4C

| Du:Dv:Dw | ZONE | TIMING_AD1 | Ia | Ib |
|---|---|---|---|---|
| Du<Dw<Dv | 2 | 0 | -AD1 | — |
| Dv<Dw<Du | 5 | 0 | — | -AD1 |
| Dw<Du<Dv OR<br>Du<Dv<Dw OR<br>Dv<Du<Dw OR<br>Dw<Dv<Du OR<br>\|Du-Dv\|<2M OR<br>\|Dv-Dw\|<2M OR<br>\|Dw-Du\|<2M | 0 | — | — | — |

FIG. 7C

INVERTER DEVICE

CROSS-REFERENCE TO RELATED APPLICATIONS

This application is based on and claims the benefit of priority from the prior Japanese Patent Application No. 2008-216593, filed on Aug. 26, 2008, the entire contents of which are incorporated herein by reference.

BACKGROUND

1. Field

The present invention relates to an inverter device which can drive two-phase induction motors with high efficiency.

2. Related Art

Electric motors used in industrial instruments and household electrical appliances need to be driven with high efficiency. Eminent techniques for this purpose include driving a brushless DC motor such as a permanent magnet motor by an inverter device. This motor-driving technique is employed in air conditioners, refrigerators and the like. However, the permanent magnet motors are expensive so that disseminating the permanent magnet motors to the world has a certain limit. On the other hand, a single-phase induction motor includes a main winding directly connected to a single-phase power supply and an auxiliary winding connected via a phase advance capacitor to the single-phase power supply. Since the single-phase induction motors have lower production costs, these motors have a wide distribution in the world. In view of importance of recent energy saving, it has been a technical problem how the single-phase induction motors could be driven with high efficiency.

As one of techniques for driving a single-phase induction motor by an inverter, Japanese patent application publication JP-A-H02-111288 discloses a motor driving arrangement including three-arm semiconductor switching elements connected to a main winding terminal, an auxiliary winding terminal and a common terminal respectively. Three sinusoidal voltages phase-shifted by 90 degrees are delivered as PWM signals so that 90-degree phase shifted sinusoidal voltages are supplied to the main and auxiliary windings. Furthermore, Japanese patent application publication JP-A-S64-8896 discloses a technique for vector-controlling a three-phase induction motor by a position sensorless control method.

However, the induction motor cannot be driven with high efficiency even when the 90-degree phase shifted sinusoidal voltages are supplied to the main and auxiliary windings, as disclosed by JP-A-H02-111288. In order that a single-phase induction motor may be driven with high efficiency, current with an optimum amplitude needs to be supplied to the main and auxiliary windings with 90-degree phase shift. Furthermore, although JP-A-S64-8896 discloses a sensorless vector control for a balanced three-phase induction motor, the disclosed control manner cannot in situ be applied to a two-phase induction motor comprising main and auxiliary windings having different winding specifications.

SUMMARY

Therefore, an object of the present invention is to provide an inverter device which can drive low-cost induction motors that have widely been used in the world.

According to one aspect of the present invention, there is provided an inverter device which drives an induction motor including a main winding and an auxiliary winding both having different winding specifications, the inverter device comprising a three-arm inverter circuit having phase output terminals connected to the main winding, the auxiliary winding and a neutral winding of the induction motor respectively and converting a DC power supply to two-phase substantially sinusoidal pulse width modulation (PWM) voltage; a current detector which detects currents of the respective main and auxiliary windings from a DC power supply current; a vector control computing unit which obtains balanced inductance values and resistance values from inductance values and resistance values of the respective main and auxiliary windings, determining a two-phase voltage to be supplied to the induction motor by vector control computing based on the balanced inductance values and resistance values; and a PWM signal forming unit which forms a PWM signal controlling the inverter circuit according to the two-phase voltage.

According to the above-described inverter device, individual voltages are supplied to the main and auxiliary windings of the induction motor, whereby optimum currents can be supplied to the main and auxiliary windings. Consequently, the induction motor can be driven with maximum efficiency. Furthermore, since the frequency is automatically reduced by the vector control during starting or overload condition, the induction motor can continuously be rotated without interruption or stop.

BRIEF DESCRIPTION OF THE DRAWINGS

FIG. 4C shows a current conversion table;

FIGS. 7A, 7B and 7C are views similar to FIGS. 4A, 4B and 4C respectively, showing a second embodiment.

DETAILED DESCRIPTION

Figure 1A:
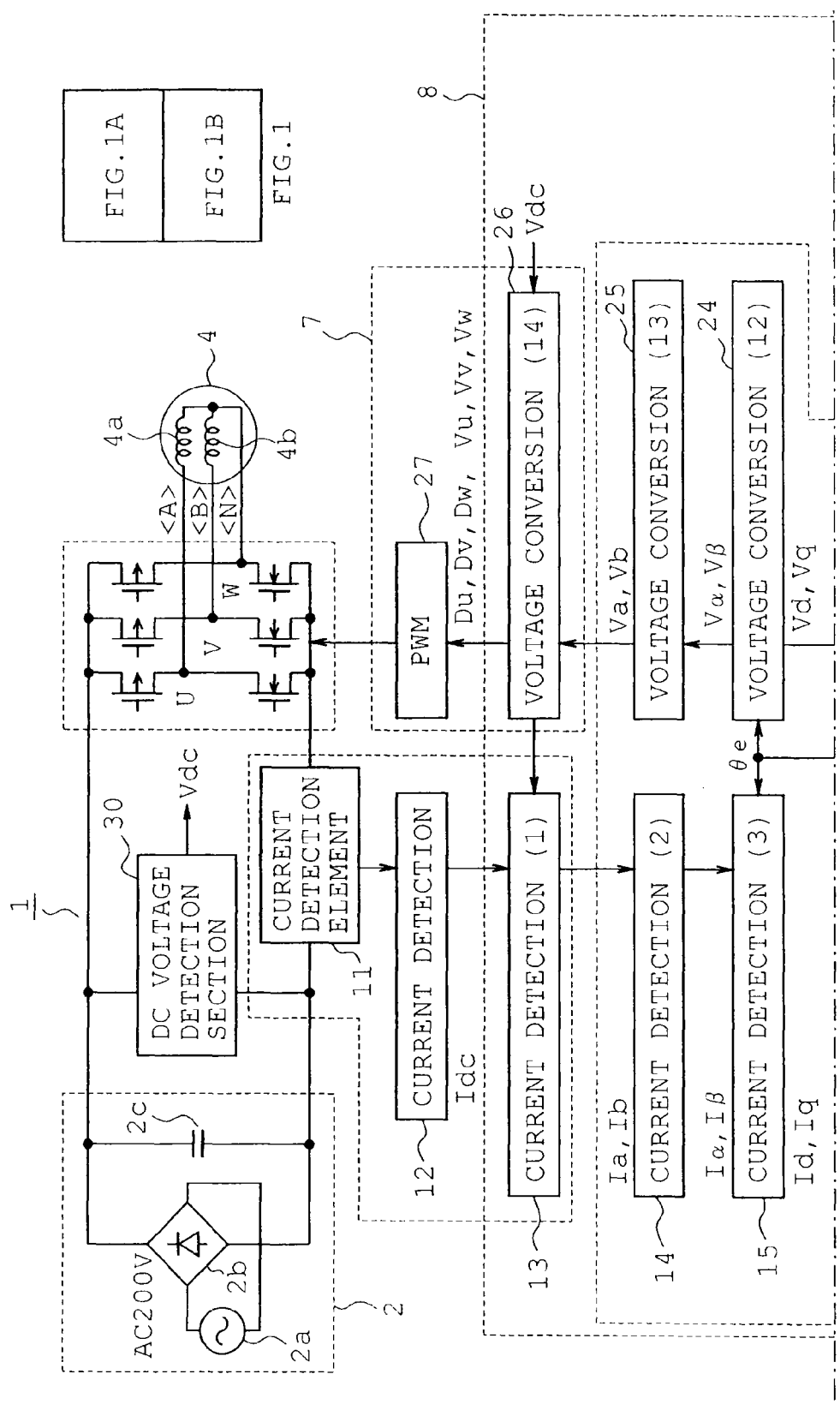
FIG. 1 is a block diagram showing an electrical arrangement of the inverter device in accordance with a first embodiment.
Figure 1B:
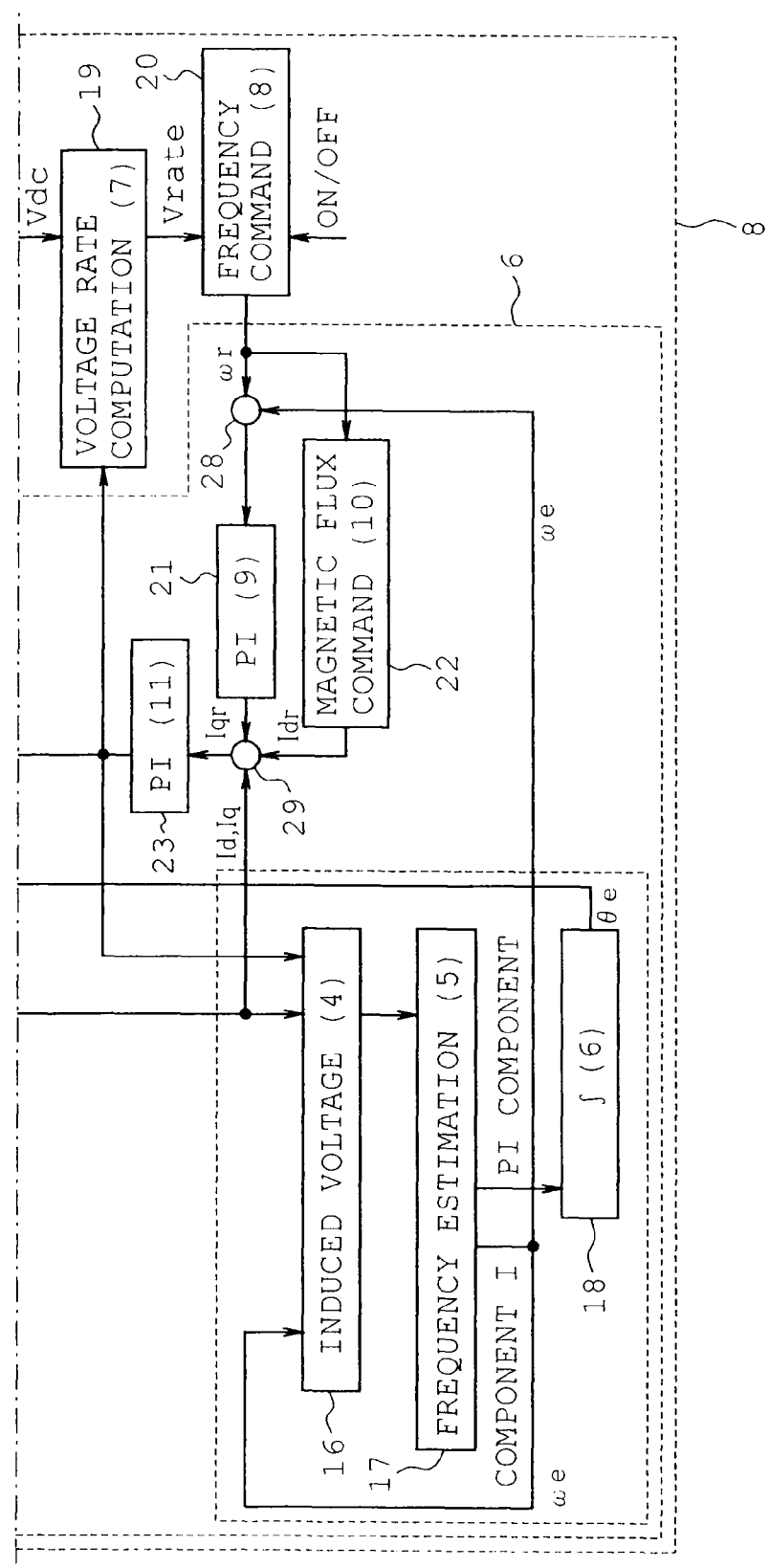

A first embodiment will be described with reference to FIGS. 1 to 6. Referring to FIG. 1, an electrical arrangement of an inverter device 1 of the first embodiment is shown. A direct current (DC) power supply 2 includes an alternating current (AC) power supply 2a, a reactor (not shown), a rectifier diode 2b and a capacitor 2c. A three-arm inverter circuit 3 is composed of six switching elements, such as insulated gate bipolar transistors (IGBTs) or metal-oxide semiconductor field-effect transistors (MOSFETs), which are connected into a three-phase bridge configuration. The inverter circuit 3 is connected via a current detecting element 11 (one shunt current detection) provided at the negative side to the DC power supply 2. The current detecting element 11 comprises a resistance element, for example.

The inverter circuit 3 has an output terminal U connected to an auxiliary winding 4a (phase A) of an induction motor 4, an output terminal V connected to a main winding 4b (phase B) of the induction motor 4 and an output terminal W connected to a midpoint (phase N) between the main and auxiliary windings 4b and 4a. The induction motor 4 is a two-phase induction motor obtained by eliminating a capacitor from a capacitor-run single-phase motor including an auxiliary winding normally provided with a capacitor and powered from a single-phase alternating current (AC) power supply. The main and auxiliary windings 4b and 4a have different numbers of turns and different wire diameters and are accordingly in an unbalanced state. The induction motor 4 is used as a compressor motor incorporated in a compressor constituting a heat cycle of a refrigerator, for example.

A current detection section 5 (a current detecting unit) comprises the current detecting element 11, a current detecting section 12 which amplifies both terminal voltages and converts amplified terminal voltages to current data Idc by analog-to-digital (A/D) conversion and a first current conversion section 13 which is realized by software on a microcomputer 8. The aforesaid A/D-converted current data can be processed by the microcomputer 8.

A vector control computation section 6 is also a function realized by software on the microcomputer 8 and comprises a second current conversion section 14 (a current balancing unit), a third current conversion section 15 which obtains d-axis and q-axis currents Id and Iq by conversion, an induced voltage computing section 16 determines a rotation angle, a frequency estimation section 17, an integration section 18, adders 28 and 29 which determine d-axis and q-axis voltages respectively, proportional-integral (PI) computing units 21 and 23, a magnetic flux command section 22, a first voltage conversion section 24 which determines output voltage, and a second voltage conversion section 25 (voltage unbalancing unit). A pulse width modulation (PWM) signal forming section 7 (a PWM signal forming unit) comprises a third voltage conversion section 26 (a command voltage computing unit) realized by software and a PWM section 27.

The microcomputer 8 is further provided with a voltage rate computing section 19 which obtains a voltage rate of output voltage of the inverter circuit 3 to DC voltage delivered from the DC power supply and a frequency command section 20 which generates and delivers a frequency command ωr based on the result of voltage rate computation. A direct current (DC) voltage detection section (a DC voltage detecting unit) 30 is provided between DC bus bars of the inverter circuit 3. The DC voltage detection section 30 comprises a voltage-divided resistance, for example. Voltage Vdc detected by the DC voltage detection section 30 is supplied both to the voltage rate computing section 19 and to the third voltage conversion section 26.

Figure 2:
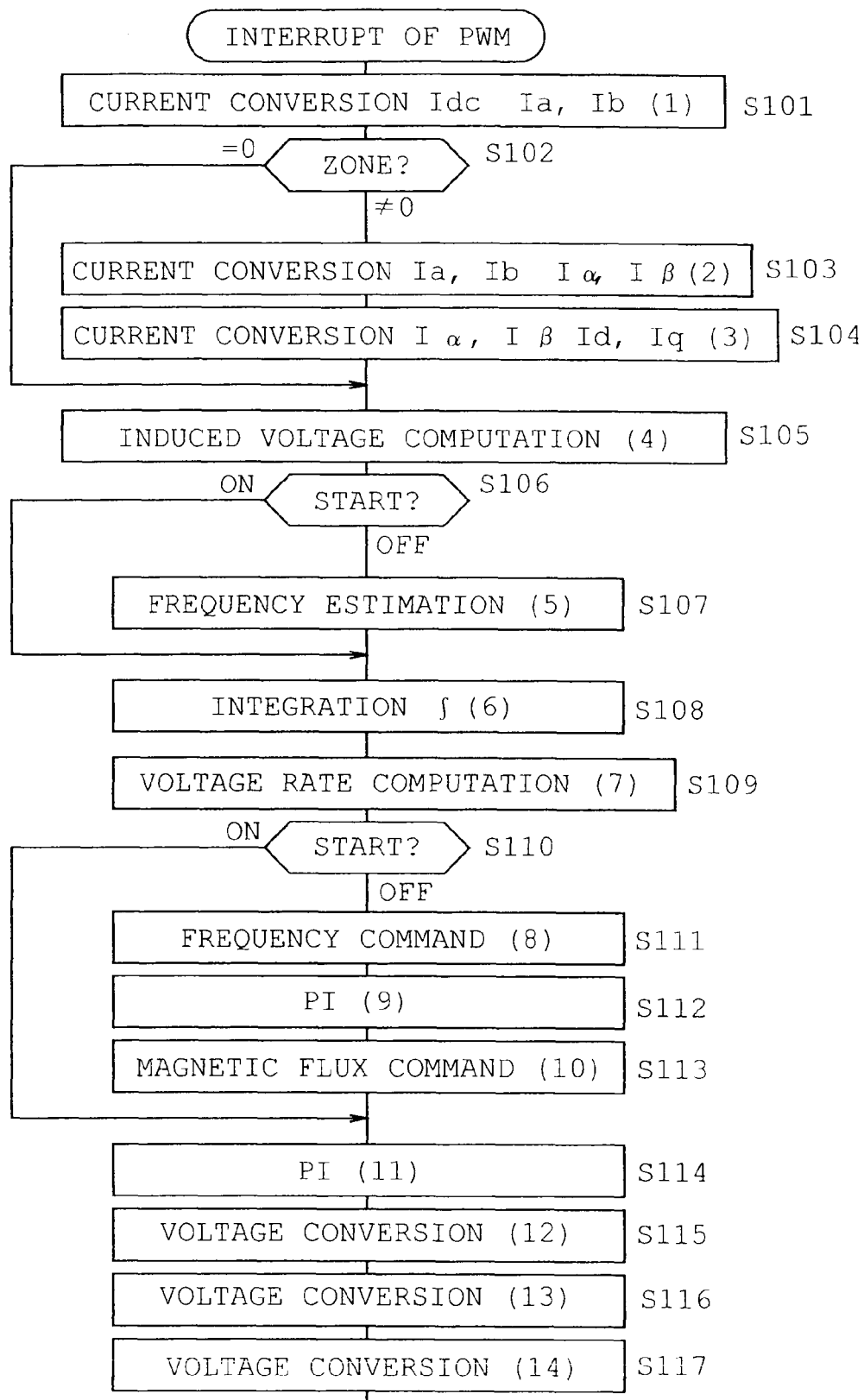
FIG. 2 is a flowchart showing PWM interrupt processing.

The operation of the inverter device 1 will now be described with reference to FIGS. 2 to 6. FIG. 2 is a flowchart showing a PWM interrupt processing repeated in synchronization with reach of the amplitude of a PWM carrier wave to the bottom (zero level) in the microcomputer 8. Parenthesized numerals in the flowchart correspond to those in FIG. 1.

In current conversion (1) at step S101, winding currents Ia and Ib of the induction motor 4 are obtained from two current data AD0 and AD1 further obtained by A/D-converting the detected current Idc in the current detecting part 12 respectively. Furthermore, the timing of the A/D conversion is also set at step S101. In the current conversion (1), the following computation is carried out according to a zone which will be described later:

If zone=1→Ia=AD1−AD0 Ib=AD0
If zone=2→Ia=−AD1 Ib=AD0
If zone=3→Ia=−AD1 Ib=AD1−AD0
If zone=4→Ia=AD1−AD0 Ib=−AD1
If zone=5→Ia=AD0 Ib=−AD11
If zone=6→Ia=AD0 Ib=AD1−AD0 and no processing is carried out when zone=0.

In the above-described processing, the zone is determined as shown in a current conversion table of FIG. 4C according to previously determined duty data Du, Dv and Dw in step S117: voltage conversion (14) which will be described later:

|Du−Dv|<2M or |Dv−Dw|<2M or |Dw−Du|<2M→zone=0
Dw<Du<Dv→zone=1
Du<Dw<Dv→zone=2
Du<Dv<Dw→zone=3
Dv<Du<Dw→zone=4
Dv<Dw<Du→zone=5
Dw<Dv<Du→zone=6

More specifically, zone=(1 to 6) is determined according to magnitude relation of duties Du, Dv and Dw.

Furthermore, an AD conversion timing of the current detecting section 12 is determined on the basis of the current conversion table. Of two A/D converters, the A/D converter AD1 is fixed to a bottom timing of the carrier wave, whereas a timing of the A/D converter AD0 is determined according to the zone. The determined timing is set in the two A/D converters.

If zone=1→T(Du+M)
If zone=2→T(Dw+M)
If zone=3→T(Dv+M)
If zone=4→T(Du+M)
If zone=5→T(Dw+M)
If zone=6→T(Dv+M)

where constant M is determined according to a delay time of the inverter circuit 3 and a current oscillation time after switching so as to eliminate these influences. Furthermore, constant M is also used in the determination of zone=0, and no processing is carried out in the case of zone=0 where the absolute value of the difference between duties of two phases is less than 2M.

Symbol "T" in the above-described case is a function designating the timing at the leading side of the carrier wave on the base of the bottom of the carrier wave when a subsequent AD0 data is to be obtained. For example, as shown in FIG. 5A, in case of T(Dw+M), AD0 data is obtained which is converted ay the leading side timing of (Dw+M) relative to the time when the carrier wave level subsequently reaches the bottom. As a result, each A/D converter of the current detection section 12 automatically carries out the A/D conversion at the time leading by (Dw+M) from the time when the carrier wave subsequently reaches the bottom. Consequently, each A/D converter of the current detecting section 12 automatically carries out the A/D conversion at the set time, and the converted data is held as AD0 and AD1.

Figure 3A:
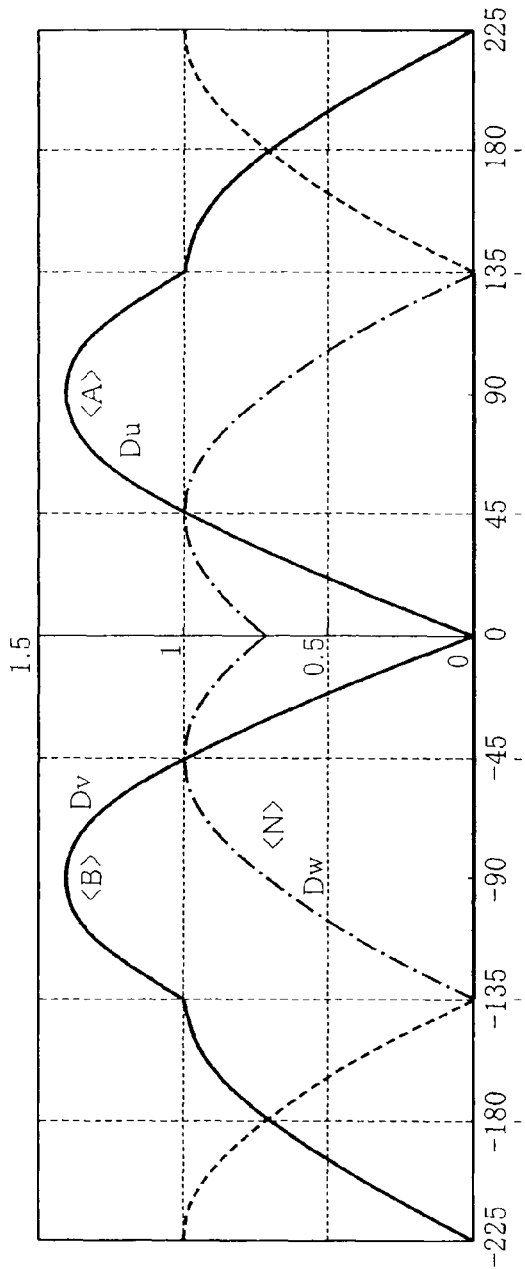
FIG. 3A shows a waveform of voltage delivered by an inverter circuit according to an energization signal.

Current conversion (1) to be carried out at step S101 will now be described with reference to the timing charts of FIGS. 3A to 4C. FIG. 3A shows a waveform of voltage delivered by the inverter circuit according to an energization signal formed at step S117: voltage conversion (14) which will be described later. Here, the waveform is analog though an actual waveform is a PWM waveform. Thus, six zones are obtained by comparing the magnitude of the phase duties Dw, Dv and Du. When zone=0, each zone is located near a zone where each zone transits.

Figure 3B:
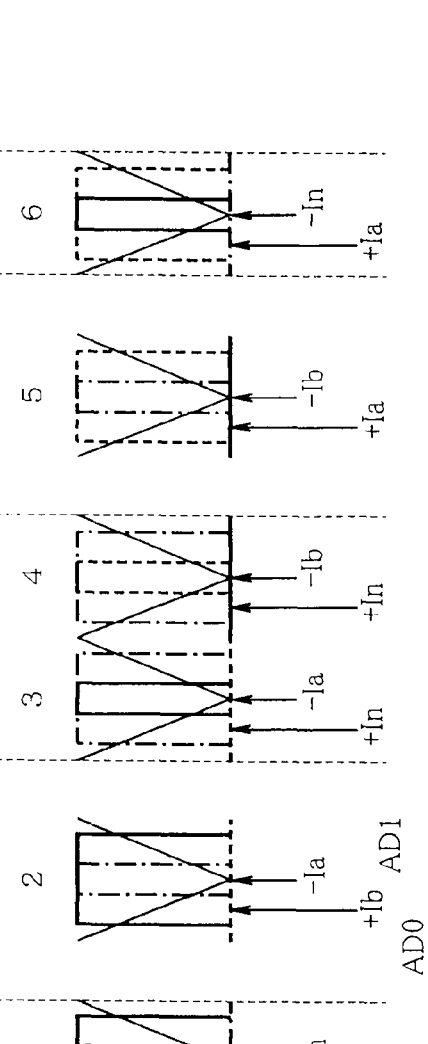
FIG. 3B shows PWM waveforms corresponding to respective zones.

FIG. 3B shows PWM waveforms corresponding to respective zones. For example, when zone=2, current Idc flowing into the current detecting element 11 corresponds with current Ib of the main winding 4b at the time of AD0. Current Idc corresponds with negative current Ia of the auxiliary winding 4a (a lower arm of the corresponding phase of the inverter circuit 3 is turned on) at the time of AD1. Phase B waveform (solid line), phase A waveform (broken line) and phase N waveform (alternate long and short dash line) as shown in FIG. 3A correspond to PWM waveforms of the respective line types as shown in FIG. 3B.

Figures 4A, 4B:
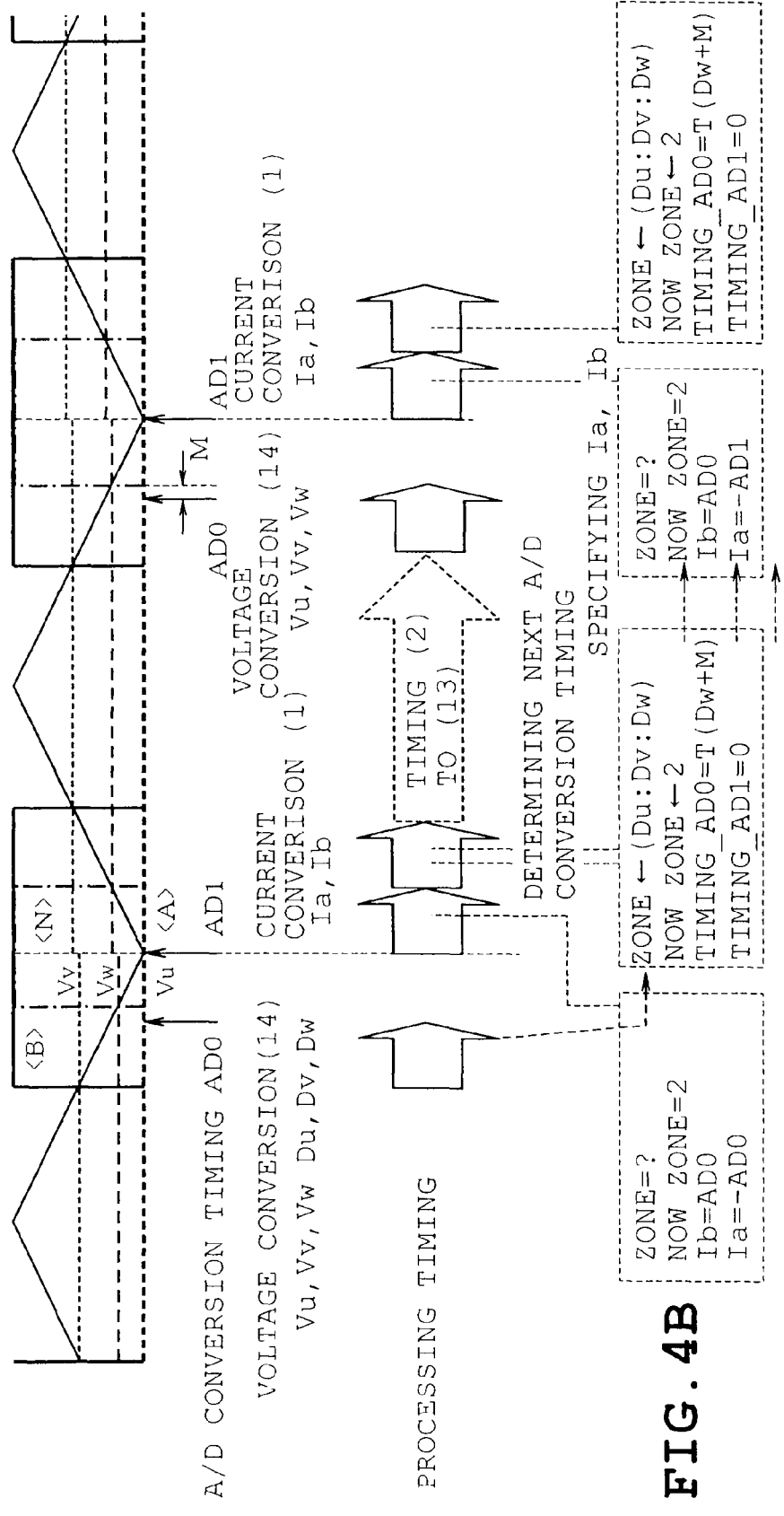
FIG. 4A is similar to FIG. 3B, showing more detailed voltage waveform where zone=2.
FIG. 4B shows contents of the processing carried out in the case of FIG. 4A.

FIG. 4A shows a more detailed timing chart in the case where zone=2. In the current conversion (1), currents Ia and Ib can be detected when processing starts immediately after the time when the level of the carrier wave has reached the bottom and the terminal voltage of the current detecting element 11 is A/D-converted. A subsequent zone is determined every time and the A/D conversion timing is determined according to the zone as shown in FIG. 4B, whereby the current detection is continued. For example, when the values of duties Dv and Dw are approximate to each other, accurate detection cannot be carried out by the influences of switching upon the current amplitude. However, the constant M is provided in the above-described processing so that zone=0, whereupon the processing can be prevented from the aforesaid influences.

Returning now to FIG. 2, it is determined at step S102 whether steps S103 and S104 should be carried out depending upon the above-described zone. Since the currents Ia and Ib are not renewed when zone=0, processing at steps S103 and S104 is not necessitated. When zone≠0, the following calculation is carried out in current conversion (2) at step S103:

$$I\alpha = (La/Lb)Ia \quad (1)$$

$$I\beta = Ib \quad (2)$$

where La and Lb are inductance values of the auxiliary and main windings 4a and 4b respectively. Thus, when the current of the auxiliary winding 4a is converted on the basis of the main winding 4b, unbalanced currents of the induction motor 4 can be treated as virtual balanced currents of the induction motor. Initial values of Iα and Iβ are 0 (the same is applied to subsequent steps).

Figure 5:
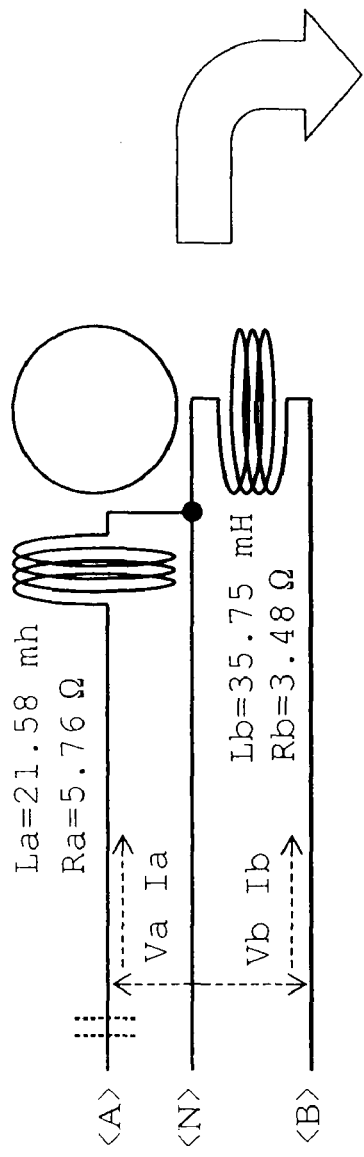
FIG. 5 is a view explaining computation for balancing motor currents.
Figure 5:
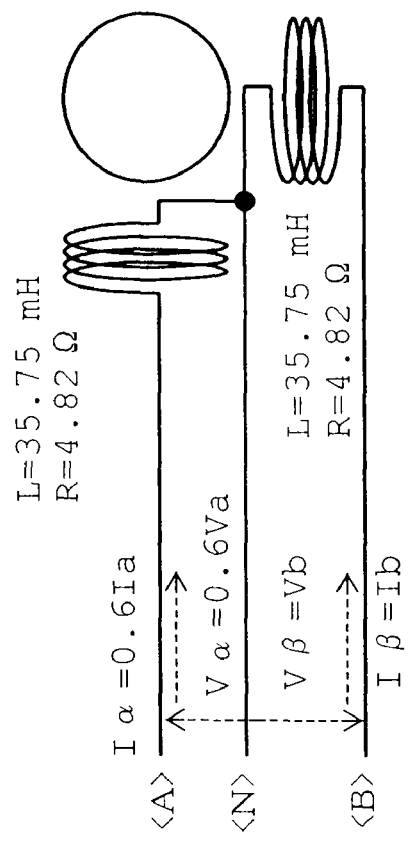
Figure 6:
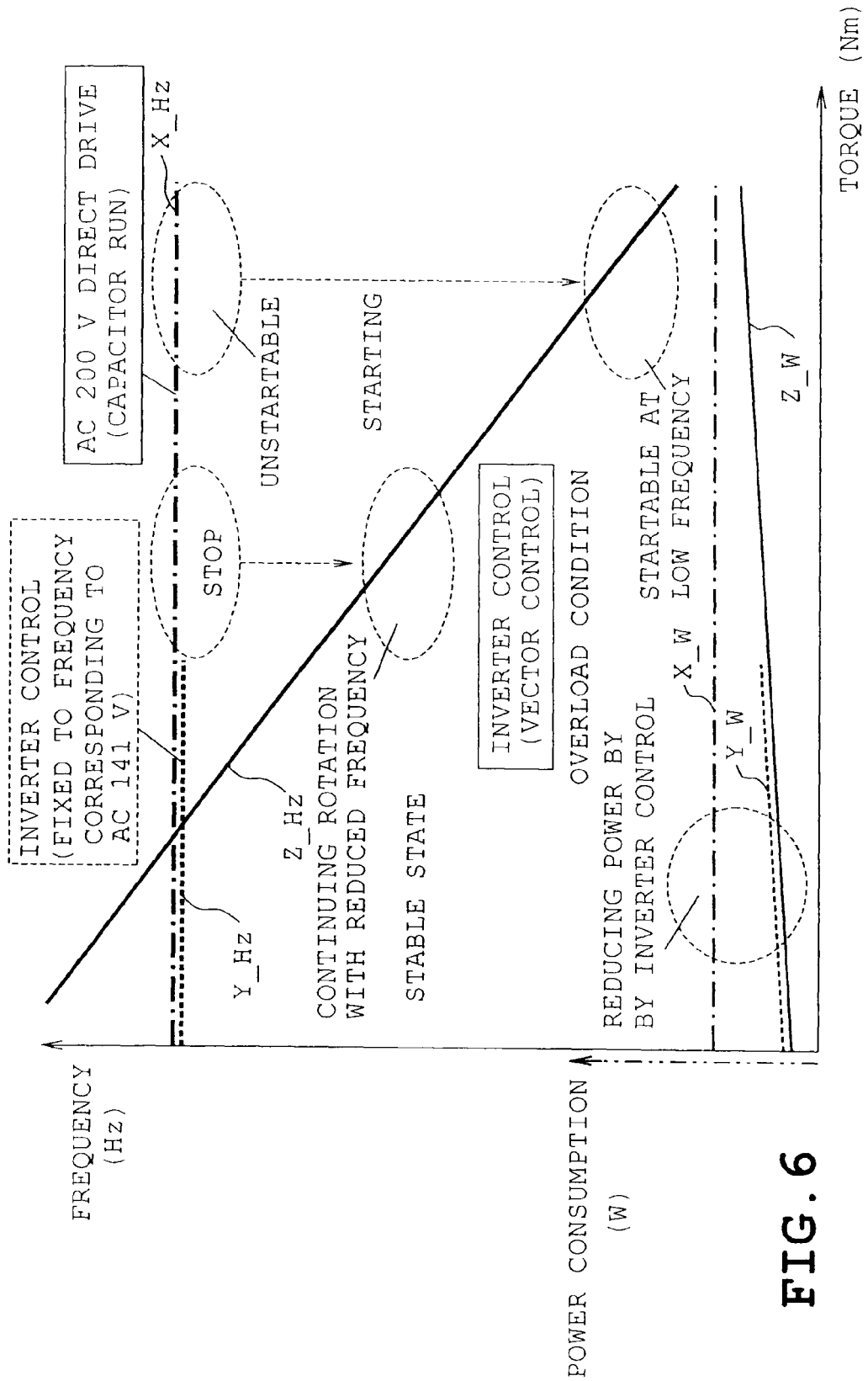
FIG. 6 is a graph explaining the effect of the inverter device.

FIG. 5 shows a concept of computation processing for balancing motor current. More specifically, the induction motor 4 is regarded as a virtual motor having balanced two-phase windings for the sake of convenience in the vector control computation although actually having unbalanced two-phase windings. For this purpose, the winding inductance and resistance values are converted to balanced values.

Furthermore, the following computation is carried out in current conversion (3) at step S104:

$$\theta et = \theta e + T\omega e(I) \quad (3)$$

$$Id = I\alpha \cos\theta et + I\beta \sin\theta et \quad (4)$$

$$Iq = -I\alpha \sin\theta et + I\beta \cos\theta et \quad (5)$$

where T is an interrupt computation cycle, ωe(I) is an integral component of the frequency previously obtained in frequency estimation (5) which will be described later, and θet is a latest electrical angle based on the result of previous calculation and is converted to d-axis and q-axis currents Id and Iq in above equations (4) and (5).

Induced voltages Ed and Eq on the d-axis and q-axis are calculated by induced voltage calculation at step S105. An inductance value L of the induction motor 4 necessary for the calculation is based on the main winding 4b, and a resistance value R is set on the basis of the relation with the power equation as follows:

$$L = Lb \quad (6)$$

$$R = \{Ra(Lb/La)^2 + Rb\}/2 \quad (7)$$

$$Ed = Vd - R \cdot Id - Ld \cdot Id/dt + \omega e(I)L \cdot Iq \quad (8)$$

$$Eq = Vq - R \cdot Iq - Ld \cdot Iq/dt + \omega e(I)L \cdot Id \quad (9)$$

where ωe is an integral component of the frequency previously obtained in the frequency estimation (5) which will be described later.

The inductance based on the main winding 4b is designated as "L" in equation (6). In this case, since the same magnetic flux as the main winding 4b is generated because of inductances La and Lb, the current necessary for the auxiliary winding 4a becomes as large as (Lb/La) times. The resistance R shown by equation (7) is calculated from electrical energy in the case where one-ampere (1 A) current is supplied to the winding. More specifically, copper loss of the main winding 4b due to the supply of 1 A current is obtained as follows:

$$Rb \cdot (1/\sqrt{2}) \cdot (1/\sqrt{2}) = Rb/2 \quad (7.1)$$

and since the current as large as (Lb/La) times is caused to flow, the copper loss of the auxiliary winding 4a is shown as:

$$Ra \cdot (Lb/La)(1/\sqrt{2}) \cdot (Lb/La)(1/\sqrt{2}) = Ra \cdot (Lb/La)^2/2 \quad (7.2)$$

Total copper loss is summation of these values. "√2" stands for a square root of numeral 2. A balanced virtual winding resistance R used in the vector control is shown as:

$$Rb/2 + Ra \cdot (Lb/La)^2/2 = 2 \cdot R \cdot (1/\sqrt{2}) \cdot (1/\sqrt{2}) \quad (7.3)$$

Accordingly, equation (7) is obtained.

A flag Start is determined at step S106. The flag is in an "on" state for several second after supply of an on-signal to the inverter device 1 and is subsequently in an "off" state. Thus, the flag indicates whether it is immediately after starting or not. When Start=on, the processing for the frequency estimation (5) at step S107 is eliminated, and electrical frequency ωe and integral component ωe(I) of the frequency are fixed to a lowest value ωlow that is a fraction of the rated frequency. On the other hand, when Start =off, the following calculation is carried out in (5) frequency estimation at step S107:

$$\omega e(I) = \omega e(I) - Ki \cdot Ed \quad (10)$$

$$\omega e = \omega e(I) - Kp \cdot Ed \quad (11)$$

where "Ki" and "Kp" are gain constants.

In equations (10) and (11), a proportional-integral computation is carried out for an electrical frequency ωe based on d-axis induced voltage. Furthermore, the electrical frequency ωe is integrated in integration (6) at step S108. The result of integration is shown by an electrical angle θe. Based on the results of computation at steps S107 and S108, current conversion (3) at aforenoted step S104 and voltage conversion (12) at step S115 are repeatedly carried out, so that electrical frequency and electrical angle are determined by a closed loop control. Thus, a position sensorless and current sensorless vector control is executed.

In voltage rate calculation (at step S109, a ratio of the current output voltage to maximum voltage the inverter device 1 can deliver is calculated:

$$Vdqdc = \{2 \cdot (Vd \cdot Vd + Vq \cdot Vq)\}^{1/2} \quad (12)$$

$$Vrate = Vdqdc/(Vdcave - V) \quad (13)$$

where voltage Vdcave is a moving average deviation of detected DC voltage value Vdc that is output of the DC power supply 2, and voltage Vdqdc is obtained by converting a current output voltage of the inverter device 1 on the basis of the previous result in voltage conversion (13) at step S116 as will be described later. The rate of the voltage Vdqdc is calculated as Vrate. Symbol "V" is an excess voltage value determined in consideration of variations in Vdc and is set to a value equal to about 5% DC voltage.

Subsequently, the flag Start is determined again at step S110 as shown in FIG. 2. In the case of Start=on, the control sequence advances to step S114 without execution of steps S111 to S113, fixing the frequency command ωr to minimum value ωlow. Furthermore, a q-axis current command Iqr is set to a previously determined starting current Iqr0. On the other hand, in the case of Start=off, the frequency command ωr is determined by the following calculation in frequency command (8) at step S111. The frequency command ωr is adjusted by a gain constant Kz so as to be increased when the voltage rate Vrate is small and the output voltage is excess and so as to be reduced when the voltage rate Vrate is large. As a result, the frequency command ωr is determined so that the voltage rate Vrate becomes 10%:

$$\omega r = \omega r - Kz \cdot (Vrate - 1) \quad (14)$$

$$\omega low < \omega r < \omega high$$

More specifically, the minimum value ωlow and maximum value ωhigh of the frequency command ωr are limited by mechanical constraint of the system including the induction motor 4.

In PI calculation (9) at step S112, $$Iqr(I) = Iqr(I) + Ksi(\omega r - \omega e(I)) \quad (15)$$

$$Iqr = Iqr(I) + Ksp(\omega r - \omega e(I)) \quad (16)$$

Thus, the torque current command Iqr is determined according to the difference between the frequency command ωr and the electrical frequency ωe where Ksi and Ksp are gain constants.

Furthermore, in magnetic flux command (10) at step S113, a magnetic flux current command Idr necessary for the induction motor 4 is determined according to the frequency command ωr by a suitable function f:

$$Idr = f(\omega r) \quad (17)$$

In PI calculation (11) at step S114, the d-axis and q-axis voltages Vd and Vq are obtained by the following PI calculation:

$$Vd(I) = Vd(I) + Kvi(Idr - Id) \quad (18)$$

$$Vd = Vd(I) + Kvp(Idr - Id) \quad (19)$$

$$Vq(I) = Vq(I) + Kvi(Iqr - Iq) \quad (20)$$

$$Vq = Vq(I) + Kvp(Iqr - Iq) \quad (21)$$

where Kvi and Kvp are gain constants.

Furthermore, voltages Va and Vb to be applied to each winding of the induction motor 4 are calculated by voltage conversion:

$$V\alpha = Vd\cos\theta e - Vq\sin\theta e \quad (22)$$

$$V\beta = -Vd\sin\theta e + Vq\cos\theta e \quad (23)$$

$$Va = (Lb/La)V\alpha \quad (24)$$

$$Vb = V\beta \quad (25)$$

$$Vn = 0 \quad (26)$$

Note that an unbalancing calculation converting voltage of the auxiliary winding 4a on the basis of the main winding 4b is carried out in the voltage conversion (13).

Subsequently, the following calculation is carried out in voltage conversion (14) at step S117:

$$\text{"base"} = \min(Va, Vb, Vn) \quad (27)$$

$$Vu = Va - \text{base} \quad (28)$$

$$Vv = Vb - \text{base} \quad (29)$$

$$Vw = Vn - \text{base} \quad (30)$$

$$Du = Vu/Vdc \quad (31)$$

$$Dv = Vv/Vdc \quad (32)$$

$$Dw = Vw/Vdc \quad (33)$$

Equation (27) is the processing in which the minimum value is selected from voltages Va, Vb and Vn delivered to the auxiliary winding 4a, the main winding 4b and the midpoint between the windings 4a and 4b respectively thereby to set the selected minimum value to base. Equations (28) to (33) are calculations for two-phase modulation without the switching of the phase corresponding to the minimum output voltage of zero, that is, output voltages Vu, Vv and Vw of the inverter circuit 3 are determined on the basis of the differences between the minimum voltage and the aforesaid voltages Va, Vb and Vn. Furthermore, since PWM duties Du, Dv and Dw are determined on the basis of the DC voltage Vdc, the voltages Vu, Vv and Vw of the inverter circuit 3 can be supplied to the induction motor 4 without depending upon variations of the DC voltage Vdc.

The PWM section 27 compares the PWM duties Du, Dv and Dw determined by the microcomputer 8 with a carrier wave having a predetermined frequency to generate PWM signals, thereby on-off controlling the switching elements of the inverter circuit 3. FIG. 4A shows the output voltage waveforms in the above-described case. The foregoing operation is repeated in the interrupt processing at every PWM carrier wave frequency so that the frequency is controlled according to load torque in a minor loop, whereby the induction motor 4 is driven at maximum efficiency without loss of synchronism. Furthermore, the induction motor 4 can be controlled so as to reach a maximum frequency according to the DC voltage in a major loop. As a result, the induction motor 4 is operated at a maximum frequency and rotational speed according to the load torque and the DC voltage.

FIG. 7 shows effects of the inverter device 1. The axis of ordinate represents load torque, and the axis of abscissas represents a frequency and power consumption. A dashed-dotted line shows the characteristic of a capacitor-run induction motor powered from a 200-volt AC power supply. When an induction motor having an auxiliary winding provided with a capacitor is directly driven from the 200-volt AC power supply, the frequency is constant depending upon the AC power supply, and the power consumption is large as a whole. On the other hand, the solid line in the graph of FIG. 7 shows the case where the induction motor is driven by the inverter device 1. The broken line shows the case where output torque of a capacitor-run induction motor is increased such that the motor stops driving.

When the induction motor 4 is driven by the three-arm inverter circuit 3, voltage applicable to the induction motor 4 is represented as "1/√2" and the load torque at the time of start is thus reduced. However, the induction motor 4 starts with the frequency being reduced by the inverter device 1. Accordingly, even a slightly lower load torque can start the induction motor 4. After start of the induction motor 4, the frequency is increased with reduction in the load torque so that the induction motor 4 is driven at a frequency equal to or above a rated frequency (a variable frequency Z_W). As a result, the power consumption can dramatically be reduced as compared with the case where the capacitor-run single-phase induction motor (X_W) is directly driven by the AC power supply (Z_W). Furthermore, when the load torque is increased during drive, the induction motor 4 is controlled so that the frequency is reduced, the induction motor 4 can be prevented from loosing synchronism and stopping.

According to the above-described embodiment, the three-phase output terminals of the inverter circuit 3 of the inverter device 1 are connected to the main winding 4b, auxiliary winding 4a and neutral line respectively so that the DC voltage supplied from the DC power supply 2 is converted to two-phase substantially sinusoidal PWM voltage. When the currents Ib and Ia of the main and auxiliary windings 4b and 4a are detected from the DC power supply current detected by the current detector section 5, the inductance values and resistance values of the main and auxiliary windings 4b and 4a are balanced. The vector control computation section 6 determines the two-phase voltage to be delivered to the induction motor 4. The PWM signal forming section 7 then forms PWM signals for controlling the inverter circuit 3.

Accordingly, the independent voltages can be supplied to the respective main and auxiliary windings 4b and 4a of the induction motor 4, whereby optimum currents can be caused to flow into the respective windings. Consequently, the induction motor 4 can be driven at maximum efficiency. Furthermore, since the frequency is automatically reduced during starting or an over load condition, rotation of the induction motor 4 can be continued without stop of the induction motor 4. Additionally, since the drive frequency is changed according to the load torque, the induction motor 4 with the two-phase configuration can be driven at lower power consumption.

Furthermore, a cost reduction can be achieved by using the three-arm inverter circuit 3 for the main and auxiliary windings 4b and 4a. Since one of the three arms of the inverter circuit 3 is controlled so as not normally to be switched (the two-phase modulation), the loss can be reduced in the inverter circuit 3.

Furthermore, the vector control computation section 6 multiplies the main and auxiliary winding currents Ib and Ia by the inductance ratio between the auxiliary and main windings 4a and 4b thereby to obtain the horizontal and vertical components Ia and Id of the winding currents. The horizontal and vertical components Va and VP are multiplied by the inductance ratio between the main and auxiliary windings 4b and 4a, whereby the two-phase voltages Va and Vc are obtained. Consequently, the vector control can readily be applied to induction motors in which the main and auxiliary windings 4b and 4a are unbalanced.

The PWM signal forming section 7 obtains the minimum value "base" among the two-phase voltages Va and Vb determined by the vector control computation section 6 and the neutral voltage Vn. The PWM signal forming section 7 further obtains by computation command voltages Vu, Vv and Vw of the PWM signals serving as relative values on the basis of the minimum value "base." The results obtained by dividing the command voltages Vu, Vv and Vw by the DC voltage Vdc serve as three-phase duties Du, Dv and Dw of the PWM signals. Accordingly, since the PWM duties are automatically adjusted for voltage variations in the DC power supply 2, an optimum energization can be maintained for the induction motor 4 even under the bad electrical power situation. Consequently, a high efficiency can be retained without adverse effect on the variations in the power supply voltage, whereby production of oscillations caused by the voltage variations can be suppressed. Furthermore, since the drive frequency of the induction motor 4 is controlled according to the detected DC voltage Vdc, the induction motor 4 can be controlled so as normally to exert maximum output.

Additionally, the current detecting section 5 classifies the energized state into seven zones based on the relationship among the command voltages Vu, Vv and Vw or the PWM duties Du, Dv and Dw. The relationship is determined among timings for current detection carried out at a plurality of times, the results of detection of each timing and the main winding current Ib and auxiliary current Ia. Consequently, the current detecting element 11 inserted into the DC bus can be used for the current detection, whereupon the costs can be reduced as compared with the case where current detecting circuits are provided in series to the respective windings of the induction motor 4.

Figures 7A, 7B:
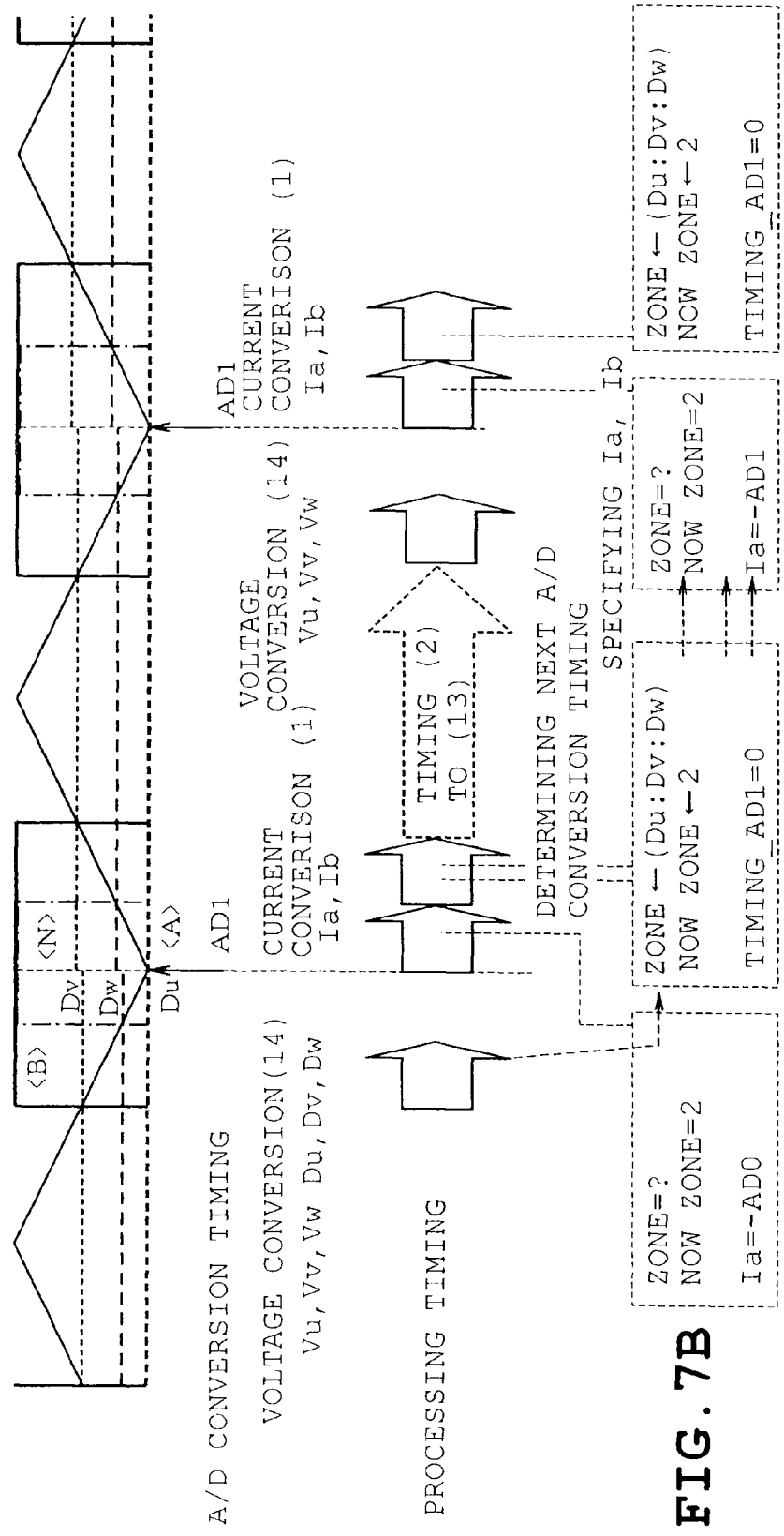

FIGS. 7A to 7C illustrate a second embodiment. Identical or similar parts in the second embodiment are labeled by the same reference symbols as those in the first embodiment, and the description of these parts is eliminated. Only the difference between the first and second embodiments will be described. FIGS. 7A-7C are views similar to FIGS. 3A to 3C in the first embodiment. The current conversion section 13 in FIG. 1 and the current conversion (1) at step S101 in FIG. 2 are simplified in the second embodiment. AD0 is not used as the A/D converter, and only AD1 is used. Thus, the current conversion table is changed as shown in FIGS. 7A-7C.

The current conversion table has only three zones 2, 5 and 0. Since only the AD converter AD1 is used, the conversion timing may be fixed to the bottom of the carrier wave. In zone=2, energization is carried out only between phase B upper arm and phase N lower arm (Du<Dw<Dv). In zone=5, energization is carried out only between the phase A upper arm and phase N lower arm (Dv<Dw<Du). In zone=0, all the other zones are involved.

In this case, the current detection is possible only in zone=2 or 5. Since the induction motor 4 has two-phase windings, even these zones occupy an electrical angle of 180 deg that is a half. Furthermore, although both currents Ia and Ib cannot be detected at the same time, a high responsibility is not necessitated in the application of the inverter device 1 to a refrigerator, for example, in which load is relatively balanced. As a result, there is no problem in the application since a high responsibility is unnecessary.

According to the second embodiment, the current detecting section 5 classifies the energized state into the zone=2 in which energization is carried out only between phase B upper arm and phase N lower arm, the zone=5 in which energization is carried out between phase A upper arm and phase N lower arm, and the zone=0 in which energization is carried out in the other zones, based on the relation among the command voltages Vu, Vv and Vw or PWM duties Du, Dv and Dw. As a result, the relationship is determined among the timing of current detection, the results of the detection, the main winding current Ib, auxiliary winding current Ia, regarding each zone. Consequently, the control can be carried out in a more simplified manner.

The foregoing embodiments and drawings are not restrictive and can be modified in the following manners: regarding zone=0 in the first embodiment, the absolute value of the duty difference between two phases need not be set so as to be less than 2M. In short, in actual processing, the duty difference may be set to a suitable range by finding the level at which the duty difference between two phases cannot significantly be detected.

A vector control can be employed in which a slip frequency and a rotational frequency of a rotor of the induction motor are obtained by calculation without elimination.

Although the single phase 200-volt power supply is used and the 200-volt induction motor is used in each foregoing embodiment, a 100-volt induction motor may be used and a three-phase 100-volt power supply may be used, and voltage doubler rectification may be employed as the DC power supply forming section, instead.

The foregoing description and drawings are merely illustrative of the principles and are not to be construed in a limiting sense. Various changes and modifications will become apparent to those of ordinary skill in the art. All such changes and modifications are seen to fall within the scope as defined by the appended claims.

What is claimed is:

1. An inverter device which drives an induction motor including a main winding and an auxiliary winding both having different winding specifications, the inverter device comprising:
   a three-arm inverter circuit having phase output terminals connected to the main winding, the auxiliary winding and a neutral winding of the induction motor respectively and converting a DC power supply to two-phase substantially sinusoidal pulse width modulation (PWM) voltage;
   a current detector which detects currents of the respective main and auxiliary windings from a DC power supply current;
   a vector control computing unit which obtains balanced inductance values and resistance values from inductance values and resistance values of the respective main and auxiliary windings, determining a two-phase voltage to be supplied to the induction motor by vector control computing based on the balanced inductance values and resistance values; and
   a PWM signal forming unit which forms a PWM signal controlling the inverter circuit according to the two-phase voltage.

2. The inverter device according to claim 1, wherein the vector control computing unit includes a current balancing unit which multiplies the main winding current and the auxiliary winding current both detected by the current detector by an inductance ratio between the auxiliary and main windings, thereby obtaining a horizontal current component and a vertical current component.

3. The inverter device according to claim 1, wherein the vector control computing unit includes a voltage unbalancing unit which multiplies a horizontal voltage component and a vertical voltage component by an inductance ratio between the auxiliary and main windings, thereby obtaining two-phase voltages applied to the induction motor.

4. The inverter device according to claim 1, wherein the PWM signal forming unit includes a command voltage computing unit which obtains a minimum value between the two-phase voltages determined by the vector control computing unit and a neutral voltage and further computes command voltages of the PWM signals, as a relative value based on the minimum value.

5. The inverter device according to claim 4, further comprising a DC voltage detector which detects a DC power supply voltage, wherein the PWM signal forming unit divides command voltages Vu, Vv and Vw delivered from the command voltage computing unit, by the DC power supply voltage, thereby employing a result of the division as respective phase duties of the PWM signals.

6. The inverter device according to claim 1, wherein the current detector classifies an energization state into seven zones based on relations between the command voltages and the PWM duties, thereby determining relations among a timing of current detection which is carried out at a plurality of times with respect to each zone, results of detection of each timing and the main and auxiliary winding currents.

7. The inverter device according to claim 1, wherein the current detector classifies an energized state into a first zone where energization is effected between a first phase upper arm and a third phase lower arm, a second zone where energization is effected between a second phase upper arm and a third phase lower arm, and a remaining third zone, thereby determining relations among a timing of current detection, results of the current detection, the main winding current and the auxiliary winding current with respect to each zone.

* * * * *